United States Patent
Secrest et al.

(10) Patent No.: US 12,506,434 B2
(45) Date of Patent: Dec. 23, 2025

(54) CONTINUOUS-CARRIER DISCONTINUOUS PULSE WIDTH MODULATION USING PHASE CURRENT AMPLITUDE COMPARISONS

(71) Applicant: BorgWarner Inc., Auburn Hills, MI (US)

(72) Inventors: Caleb Secrest, Noblesville, IN (US); Yang Sun, Noblesville, IN (US)

(73) Assignee: BORGWARNER INC., Auburn Hills, MI (US)

(*) Notice: Subject to any disclaimer, the term of this patent is extended or adjusted under 35 U.S.C. 154(b) by 145 days.

(21) Appl. No.: 18/495,392

(22) Filed: Oct. 26, 2023

(65) Prior Publication Data
US 2025/0141388 A1    May 1, 2025

(51) Int. Cl.
*H02P 27/08* (2006.01)
*H02M 7/5387* (2007.01)
*H02M 7/5395* (2006.01)

(52) U.S. Cl.
CPC ...... *H02P 27/085* (2013.01); *H02M 7/53873* (2013.01); *H02M 7/5395* (2013.01)

(58) Field of Classification Search
CPC ............. H02P 27/085; H02M 7/53873; H02M 7/5395; H02M 7/53876
See application file for complete search history.

(56) References Cited

U.S. PATENT DOCUMENTS

| | | | |
|---|---|---|---|
| 8,054,032 B2 | 11/2011 | Chakrabarti et al. | |
| 9,559,630 B2 | 1/2017 | Marohl et al. | |
| 2008/0079377 A1* | 4/2008 | Williams | H02P 23/0004 318/400.17 |
| 2016/0254760 A1* | 9/2016 | Zhang | H02M 7/48 363/95 |
| 2024/0178739 A1* | 5/2024 | Leppänen | H02M 1/0054 |

FOREIGN PATENT DOCUMENTS

| | | | | |
|---|---|---|---|---|
| CA | 2778072 C | * 12/2015 | | H02J 3/1857 |
| CN | 104410311 A | 3/2015 | | |

* cited by examiner

*Primary Examiner* — Bickey Dhakal
(74) *Attorney, Agent, or Firm* — CANTOR COLBURN LLP

(57) ABSTRACT

Embodiments of the disclosure provide an inverter controller operable to perform inverter controller operations that include performing a continuous carrier alignment methodology on an inverter. The continuous carrier alignment methodology includes, for a current sampling period, evaluating a shape of a carrier waveform from a prior sampling period; and determining, based at least in part on an ending location of the carrier waveform from the prior sampling period, whether or not to insert an intermediate carrier shape into the carrier waveform during the current sampling period.

20 Claims, 15 Drawing Sheets

Table I. Voltage Switching Vectors
| Voltage Vectors | Switching Vectors | | |
|---|---|---|---|
| | A | B | C |
| $V_0$ | 0 | 0 | 0 |
| $V_1$ | 1 | 0 | 0 |
| $V_2$ | 1 | 1 | 0 |
| $V_3$ | 0 | 1 | 0 |
| $V_4$ | 0 | 1 | 1 |
| $V_5$ | 0 | 0 | 1 |
| $V_6$ | 1 | 0 | 1 |
| $V_7$ | 1 | 1 | 1 |
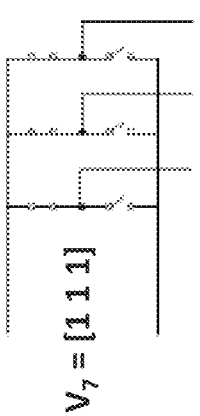
$V_7 = [1\ 1\ 1]$
310
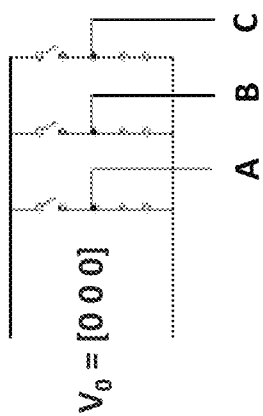
$V_0 = [0\ 0\ 0]$
320
FIG. 3

$$D_2 = MI\,(2\sqrt{3}/\pi)\,\sin(\theta_v - i\pi/3) \quad \text{Equation (1)}$$

$$D_1 = MI\,(3/\pi)\,\cos(\theta_v - i\pi/3) - D_2/2 \quad \text{Equation (2)}$$

$$D_0 = 1 - D_1 - D_2 \quad \text{Equation (3)}$$

In Equations (1)-(3), $i$ is the sector number of the SV-PWM hexagon and $$MI = |Vref|\pi/(2Vdc)$$

FIG. 7

Table II. Continuous-Carrier DPWM Clamping State Determination

| Switch (Hexagon Sector) | Positive DC Rail Clamping Condition |
|---|---|
| Case 0: | \|Phase Current A\| >= \|Phase Current C\| |
| Case 1: | \|Phase Current B\| >= \|Phase Current C\| |
| Case 2: | \|Phase Current B\| >= \|Phase Current A\| |
| Case 3: | \|Phase Current C\| >= \|Phase Current A\| |
| Case 4: | \|Phase Current C\| >= \|Phase Current B\| |
| Case 5: | \|Phase Current A\| >= \|Phase Current B\| |

Table III. Continuous-Carrier DPWM Duty Cycle Calculation

| Switch (Hexagon Sector) | PWM Alignment Mode | Duty Cycle X |
|---|---|---|
| Case 0 | Center | "Duty Cycle C" = 0.0;<br>"Duty Cycle B" = "D$_1$";<br>"Duty Cycle A" = "Duty Cycle B" + "D$_2$" |
|  | Inverse Center | "Duty Cycle A" = 1.0;<br>"Duty Cycle B" = 1.0 - "D$_1$";<br>"Duty Cycle C" = "Duty Cycle B" - "D$_2$" |
|  | Inverse Edge OR Edge | "Duty Cycle C" = 0.5 * "D$_0$";<br>"Duty Cycle B" = "Duty Cycle C" + "D$_1$";<br>"Duty Cycle A" = "Duty Cycle B" + "D$_2$" |
| Case 1 | Center | "Duty Cycle C" = 0.0;<br>"Duty Cycle A" = "D$_2$";<br>"Duty Cycle B" = "Duty Cycle A" + "D$_1$" |
|  | Inverse Center | "Duty Cycle B" = 1.0;<br>"Duty Cycle A" = 1.0 - "D$_2$";<br>"Duty Cycle C" = "Duty Cycle A" - "D$_1$" |
|  | Inverse Edge OR Edge | "Duty Cycle C" = 0.5 * "D$_0$";<br>"Duty Cycle A" = "Duty Cycle C" + "D$_2$";<br>"Duty Cycle B" = "Duty Cycle A" + "D$_1$" |
| Case 2 | Center | "Duty Cycle A" = 0.0;<br>"Duty Cycle C" = "D$_1$";<br>"Duty Cycle B" = "Duty Cycle C" + "D$_2$" |
|  | Inverse Center | "Duty Cycle B" = 1.0;<br>"Duty Cycle C" = 1.0 - "D$_2$";<br>"Duty Cycle A" = "Duty Cycle C" - "D$_1$" |
|  | Inverse Edge OR Edge | "Duty Cycle A" = 0.5 * "D$_0$";<br>"Duty Cycle C" = "Duty Cycle A" + "D$_2$";<br>"Duty Cycle B" = "Duty Cycle C" + "D$_1$" |

FIG. 11B

Table III. Continuous-Carrier DPWM Duty Cycle Calculation, continued

| Switch (Hexagon Sector) | PWM Alignment Mode | Duty Cycle X |
|---|---|---|
| Case 3: | Center | "Duty Cycle A" = 0.0;<br>"Duty Cycle B" = "D₁";<br>"Duty Cycle C" = "Duty Cycle B" + "D₂"; |
| | Inverse Center | "Duty Cycle C" = 1.0;<br>"Duty Cycle B" = 1.0 − "D₁";<br>"Duty Cycle A" = "Duty Cycle B" − "D₂"; |
| | Inverse Edge OR Edge | "Duty Cycle A" = 0.5 * "D₀";<br>"Duty Cycle B" = "Duty Cycle A" + "D₁";<br>"Duty Cycle C" = "Duty Cycle B" + "D₂"; |
| Case 4: | Center | "Duty Cycle B" = 0.0;<br>"Duty Cycle A" = "D₁";<br>"Duty Cycle C" = "Duty Cycle A" − "D₂"; |
| | Inverse Center | "Duty Cycle C" = 1.0;<br>"Duty Cycle A" = 1.0 − "D₁";<br>"Duty Cycle B" = "Duty Cycle A" − "D₂"; |
| | Inverse Edge OR Edge | "Duty Cycle B" = 0.5 * "D₀";<br>"Duty Cycle A" = "Duty Cycle B" + "D₁";<br>"Duty Cycle C" = "Duty Cycle A" + "D₂"; |
| Case 5: | Center | "Duty Cycle B" = 0.0;<br>"Duty Cycle C" = "D₁";<br>"Duty Cycle A" = "Duty Cycle C" + "D₂"; |
| | Inverse Center | "Duty Cycle A" = 1.0;<br>"Duty Cycle C" = 1.0 − "D₁";<br>"Duty Cycle B" = "Duty Cycle C" − "D₂"; |
| | Inverse Edge OR Edge | "Duty Cycle B" = 0.5 * "D₀";<br>"Duty Cycle C" = "Duty Cycle B" + "D₁";<br>"Duty Cycle A" = "Duty Cycle C" + "D₂"; |

FIG. 11C

Table IV. Continuous PWM (CPWM) Duty Cycle Calculation

| Switch (Hexagon Section) | Action |
|---|---|
| 0 | Duty Cycle C" = 0.5 × $D_0^*$<br>Duty Cycle B" = Duty Cycle C" + $D_1^*$<br>Duty Cycle A" = Duty Cycle B" + $D_2^*$ |
| 1 | Duty Cycle C" = 0.5 × $D_0^*$<br>Duty Cycle A" = Duty Cycle C" + $D_1^*$<br>Duty Cycle B" = Duty Cycle A" + $D_2^*$ |
| 2 | Duty Cycle A" = 0.5 × $D_0^*$<br>Duty Cycle C" = Duty Cycle A" + $D_1^*$<br>Duty Cycle B" = Duty Cycle C" + $D_2^*$ |

FIG. 11D

Table IV. Continuous PWM (CPWM) Duty Cycle Calculation, continued

| Switch (Hexagon Sector) | Action |
|---|---|
| 3 | Duty Cycle A" = $0.5 \times {}^{n}D_{z}^{*}$;<br>Duty Cycle B" = ${}^{n}$Duty Cycle A" + ${}^{n}D_{1}^{*}$;<br>Duty Cycle C" = ${}^{n}$Duty Cycle B" + ${}^{n}D_{2}^{*}$ |
| 4 | Duty Cycle B" = $0.5 \times {}^{n}D_{z}^{*}$;<br>Duty Cycle A" = ${}^{n}$Duty Cycle B" + ${}^{n}D_{1}^{*}$;<br>Duty Cycle C" = ${}^{n}$Duty Cycle A" + ${}^{n}D_{2}^{*}$ |
| 5 | Duty Cycle B" = $0.5 \times {}^{n}D_{z}^{*}$;<br>Duty Cycle C" = ${}^{n}$Duty Cycle B" + ${}^{n}D_{1}^{*}$;<br>Duty Cycle A" = ${}^{n}$Duty Cycle C" + ${}^{n}D_{2}^{*}$ |

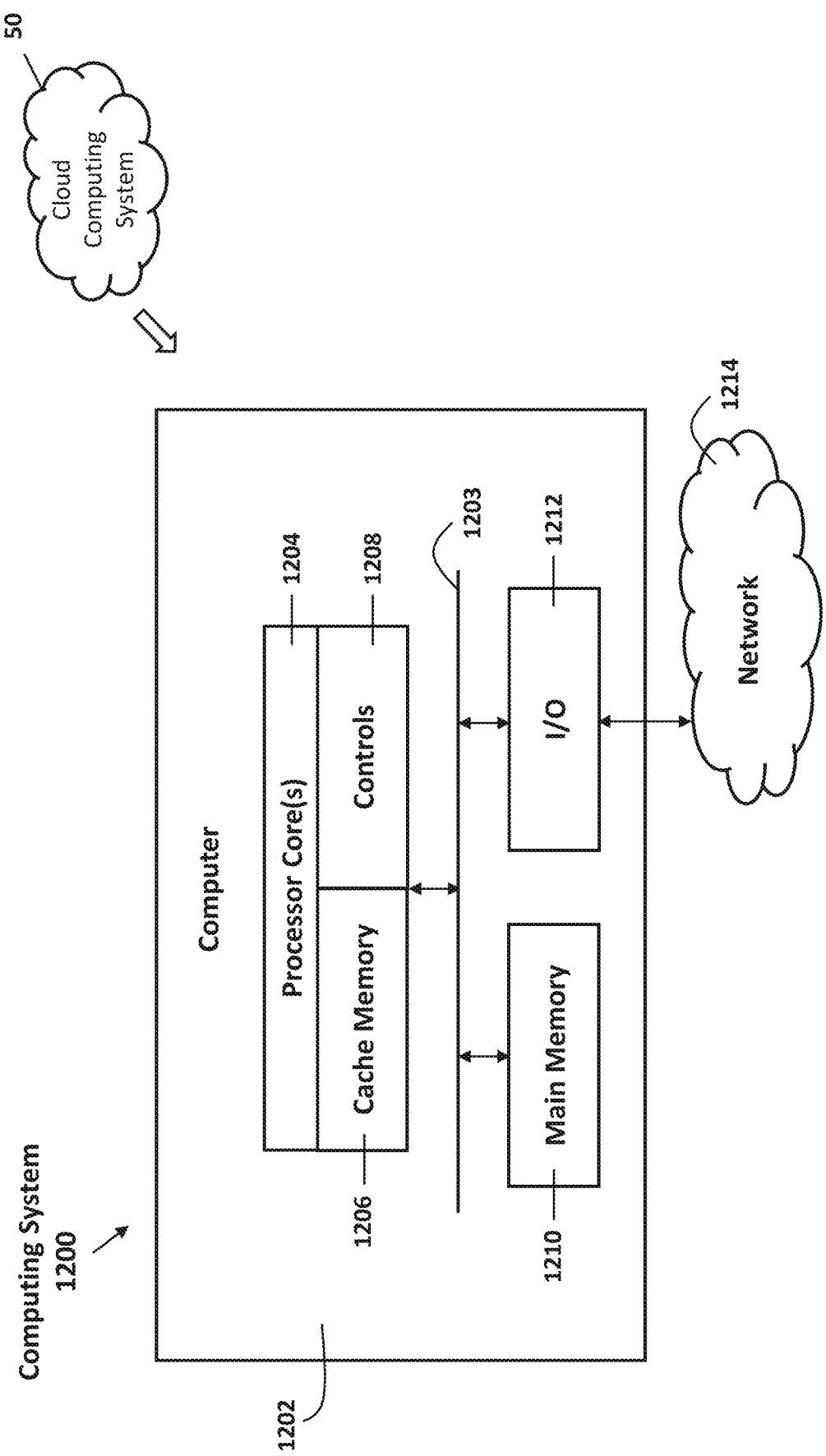

CONTINUOUS-CARRIER DISCONTINUOUS PULSE WIDTH MODULATION USING PHASE CURRENT AMPLITUDE COMPARISONS

BACKGROUND OF THE INVENTION

A known configuration of an electric motor drive system includes an electric motor and an inverter operable to convert direct current (DC) inputs to alternating current (AC) outputs that power and control (e.g., speed, torque, etc.) the electric motor. Appropriate motor control can be used to improve motor efficiency. For example, a motor's speed should be controlled to closely match the task to be performed by the motor, thereby avoiding inefficiencies that waste energy and/or materials.

A common technique for controlling the AC voltage output waveform generated by the inverter is pulse-width modulation (PWM). In general, PWM schemes reduce the average power of a signal by chopping it into discrete parts. The name PWM originates from the fact that the widths of the discrete parts, i.e., pulses, are modulated to create a desired output signal. In a typical three-phase full-bridge inverter, there are six switching elements (e.g., transistors) organized as three "phase legs," with each phase leg including two switching elements connected in series and between a positive DC rail and a negative DC rail. At any given moment, up to three of the inverter switching elements conduct while the other three inverter switching elements are open. A phase node is between the two switching elements of each phase leg to provide the three phases of a three phase AC waveform output. An example three phase AC waveform 200 is depicted in FIG. 2. An individual conductor is coupled between each phase node and one of three motor terminals to carry the three-phase AC waveform 200 to the motor. Each phase of the three-phase AC waveform 200 has the same frequency and voltage amplitude relative to a common reference but with a phase difference of one third of a cycle (i.e., 120 degrees out of phase) between each. Due to the phase difference, the voltage on any conductor reaches its peak at one third of a cycle after one of the other conductors and one third of a cycle before the remaining conductor. This phase delay gives constant power transfer to a balanced linear load.

An objective of PWM is to achieve a desired low-frequency output voltage by varying the duty cycle of the inverter switching elements. The duty cycle denotes the portion of a period during which the corresponding inverter switching element is conducting. Thus, PWM adjusts the time (duty cycle) during which the inverter switching elements are closed and open. By changing the duty cycle at a fast rate, the desired output voltage for each of the three phases can be achieved.

Carrier-based PWM is a modulation scheme that provides low harmonic distortion characteristics and simple implementation. In general, a carrier-based PWM scheme compares a reference (or control) signal to a carrier (or modulation) signal in each phase leg of the inverter. Every time these two signals (reference/carrier) cross, the associated inverter switching element is turned on or off. The carrier signal is either a saw-tooth or a triangular signal with the desired switching frequency. In a conventional implementation, one triangular carrier signal is used to modulate all three phase legs in a three-phase voltage source inverter because its symmetrical switching sequence results in lower power losses and lower total harmonic distortion (THD).

Discontinuous PWM (DPWM) is a type of PWM in which the duty cycle or each phase is clamped to the DC-rail for one-third of each period. DPWM enables switching loss reductions because, in DPWM, only two (2) switches are turned on and off over one switching period compared to, for example, three (3) switches being turned on and off over one switching period when using, for example, continuous PWM (CPWM). In DPWM, power efficiency is improved by reducing the switching losses of the inverter, particularly with high switching frequencies. With better power efficiency, less cooling equipment is needed for the inverters.

For the previously-described reference signal, there are many alternatives. For example, a modulation technique known as space vector PWM (SV-PWM) can be used to generate the reference signal. SV-PWM is a modulation scheme used to control the inverter switching elements in a manner that applies a given voltage vector to a three-phased electric motor (e.g., permanent magnet or induction machine). With the six (6) switching elements in a conventional inverter, there are eight discrete voltage vectors that can be applied instantaneously. Of these eight vectors, there are only six non-zero vectors with all six producing different voltage angles. For high-performance motor control, a smoothly rotating voltage vector is desired rather than one that skips sixty (60) degrees per step. SV-PWM schemes control the inverter switching elements in a manner that emulates a smoothly rotating voltage vector to rotate the motor. SV-PWM techniques generate pulse width modulated signals to control the switching elements of the inverter in a manner that generates and combines voltage vectors to form the three phases of the three-phase AC waveform output (e.g., the three-phase AC waveform 200 shown in FIG. 2).

In SV-PWM, to avoid short-circuiting the inverter input capacitor (e.g., capacitor 442 shown in FIG. 4) both switching elements in one phase leg can never be conducting simultaneously. Thus, each output from the three (3) inverter phase nodes (shown as "A," "B," and "C" in FIG. 3) can be in one of two phase node states. In one phase node state, the upper inverter switching element is closed (conducting), the lower inverter switching element is open (non-conducting), and this closed/open state is represented as a "one" (1) phase node state. In another phase node state, the upper inverter switching element is open (non-conducting), the lower inverter switching element is closed (conducting), and this open/closed state is represented as a zero (0) phase node state. As shown by the Table I 330 in FIG. 3, eight ($2^3$) total phase node states are available for the output (e.g., $V_0$-$V_7$ shown in FIG. 3). These phase node states are referred to as base vectors. The eight base vectors can be plotted on a hexagonal star diagram, an example of which is the hexagonal star diagram 600 depicted in FIG. 6. As shown in FIG. 6, each vector (e.g., $V_0$-$V_7$ shown in FIGS. 3 and 6) makes up a spoke of the hexagonal star, with sixty (60) degrees phase difference between adjacent vectors. The two vectors ($V_0$ and $V_7$) that contain outputs that are either all plus (e.g., $V_7$=(1 1 1) shown at inverter 310 shown in FIG. 3) or all minus (e.g., $V_0$=(000) shown at inverter 320 shown in FIG. 3) are referred to as null vectors and are plotted at the center (origin) of the hexagonal star. The goal of SV-PWM is to produce a "mean vector" during the PWM period. The PWM period means how long one $V_{ref}$ or $V_{out}$ is applied in a digital signal processor. It is usually equal to a current sampling period and the period of the carrier waveform. The location of $V_{ref}$ is determined on the star diagram, and the base vectors that constrain that sector ($V_1$ and $V_2$, for example), along with one of the null vectors, are used to synthesize the desired voltage. This is done by applying $V_1$ for a specified time $(T_1)$, $V_2$ for a specified time $(T_2)$, and the null vector a specified time $(T_0)$ to provide a resultant vector equal to $V_{ref}$ or $V_{out}$. The magnitude and frequency of the inverter output voltage can be calculated if the DC voltage into the inverter, the reference (or control) signal, and the carrier (or modulation) signal waveforms are known.

Known SV-PWM and DPWM techniques are generally effective at achieving their high-level goals of generating a rotating voltage that does not skip sixty (60) degrees per step, and reducing switching losses by pinning one of the three switching elements during the PWM period, respectively. However, there is still a need for inverter control methodologies that build on known SV-PWM and DPWM techniques to further reduce inverter switching losses (beyond reductions that are available through known SV-PWM and DPWM techniques) and to further optimize the performance and reliability of these modulation operations.

BRIEF DESCRIPTION OF THE INVENTION

Embodiments of the disclosure provide an inverter controller operable to perform inverter controller operations that include performing a continuous carrier alignment methodology on an inverter. The continuous carrier alignment methodology includes, for a current sampling period, evaluating a shape of a carrier waveform from a prior sampling period; and determining, based at least in part on an ending location of the carrier waveform from the prior sampling period, whether or not to insert an intermediate carrier shape into the carrier waveform during the current sampling period.

Embodiments of the disclosure provide a controller-implemented method that includes performing, using a processor of a controller, a continuous carrier alignment methodology on an inverter. The continuous carrier alignment methodology includes, for a current sampling period, evaluating a shape of a carrier waveform from a prior sampling period; and determining, based at least in part on an ending location of the carrier waveform from the prior sampling period, whether or not to insert an intermediate carrier shape into the carrier waveform during the current sampling period.

BRIEF DESCRIPTION OF THE DRAWINGS

FIG. 3 is a simplified block diagram and a table illustrating aspects of the disclosure;

FIG. 7 illustrates non-limiting examples of equations that can be used in performing portions of the computer-implemented methodology shown in FIG. 5;

FIG. 8 is a table illustrating how a portion of the computer-implemented methodology shown in FIG. 5 can be implemented in accordance with embodiments of the disclosure;

FIG. 11A is a first portion of a table illustrating how a portion of the computer-implemented methodology show in FIG. 5 can be implemented in accordance with embodiments of the disclosure;

FIG. 11B is a second portion of the table shown in FIG. 11A illustrating how a portion of the computer-implemented methodology show in FIG. 5 can be implemented in accordance with embodiments of the disclosure;

FIG. 11C is a first portion of a table illustrating how SV-PWM can be implemented;

FIG. 11D is a second portion of the table shown in FIG. 11C illustrating how SV-PWM can be implemented; and FIG. 12 is a simplified block diagram illustrating a computer system operable to implement embodiments of the disclosure.

DETAILED DESCRIPTION OF THE INVENTION

Figure 1:
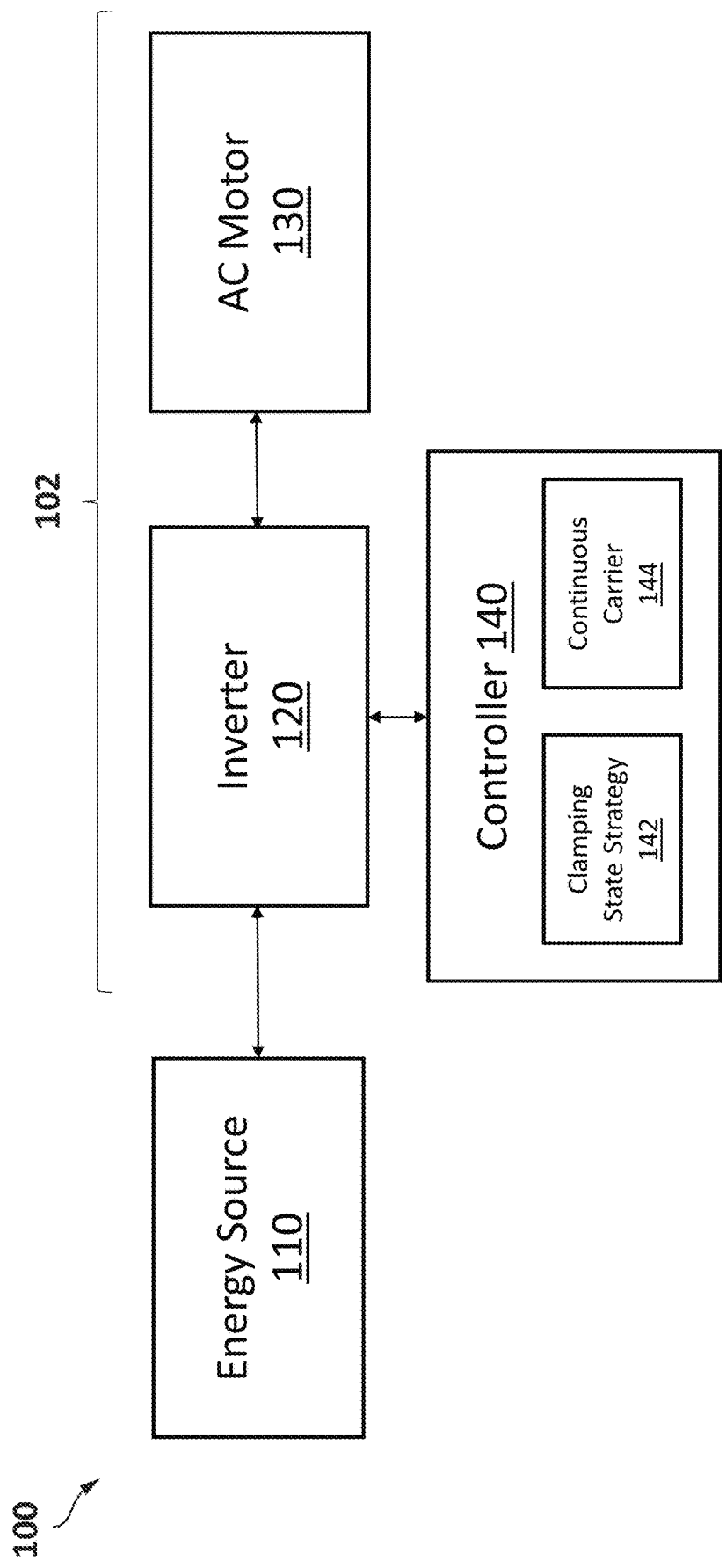
FIG. 1 is a simplified block diagram illustrating a non-limiting example of an electric drive motor system in accordance with aspects of the disclosure.

Embodiments of the disclosure provide a novel inverter control methodology for efficiently and effectively controlling the switching and modulation operations of the inverter that are used to generate alternating current (AC) in an electric motor drive system. In embodiments of the disclosure, the electric motor drive system includes an electric motor operable to receive and use the AC; a multi-level three-phase inverter operable to receive direct current (DC) from an energy source and generate the AC as a three phase AC waveform; and an inverter controller operable to control, in a novel manner, how the three phase AC waveform is generated at the necessary frequency and amplitude. In embodiments of the disclosure, a novel carrier-based SV-DPWM scheme is used that selects a clamping state (positive or negative clamping) and a to-be-clamped phase-leg from among the 3 phase-legs according to a clamping state selection strategy operable to further reduce inverter switching losses beyond what is achievable using known DPWM techniques. The clamping state selection strategy used in embodiments of the disclosure is applied for each sector of an SV hexagonal star, which calls for a corresponding selection of a carrier waveform that is matched to the selected clamping state.

When the clamping state is selected in accordance with the novel clamping state selection strategy, the inverter controller is operable to implement a novel continuous carrier alignment methodology that selectively inserts, where needed, a non-clamped intermediate duty cycle carrier between a given clamping state transition to ensure that any changes to the carrier waveform occur in a continuous manner. For example, a phase leg clamped to a positive DC rail can require a different carrier waveform than if that same phase leg or another phase leg is clamped to the negative DC rail. If the carrier waveform change is too abrupt (e.g., bringing the waveform from a high (or topmost) location to a low (or bottommost) location in less than a predetermined period of time required by the associated hardware), the physical switching elements may not be able to execute such a change. Accordingly, the novel continuous carrier alignment methodology selectively inserts, where needed, a selected type of non-clamped intermediate duty cycle carrier between a given carrier waveform transition to avoid abrupt changes that cannot be executed by the switching elements, thereby ensuring that any changes to the carrier waveform occur in a continuous manner that can be executed by the switching elements.

When there is clamping state selection in accordance with aspects of the disclosure, the inverter controller determines the ending location of the carrier waveform from the prior PWM period, and further determines the desired ending location of the carrier waveform for the current PWM period. If the prior PWM period's carrier waveform ends in a high (or topmost) location (e.g., the "Center" carrier waveform shown in FIG. 10), and if the desired ending location for the current PWM period's carrier waveform is a high (or topmost) location (e.g., the "Center" carrier shown in FIG. 10), no non-clamped intermediate duty cycle carrier is inserted. Similarly, if the prior PWM period's carrier ends in a low (or bottommost) location (e.g., the "Inverse Center" carrier shown in FIG. 10), and if the desired ending location of the current PWM period's carrier waveform is a low (or bottommost) location (e.g., the "Inverse Center" carrier shown in FIG. 10), no intermediate duty cycle carrier is inserted. However, if the prior PWM period's carrier ends in a high (or topmost) location (e.g., the "Center" carrier shown in FIG. 10), and if the desired ending location of the current PWM period's carrier waveform is a low (or bottommost) location (e.g., the "Inverse Center" carrier shown in FIG. 10), a non-clamped intermediate duty cycle carrier is inserted to prevent discontinuities in the PWM carrier waveform. For example, where the prior PWM period's carrier ends in a high (or topmost) location (e.g., the "Center" carrier shown in FIG. 10), and where the desired ending location of the current PWM period's carrier is a low (or bottommost) location (e.g., the "Inverse Center" carrier shown in FIG. 10), a non-clamped intermediate duty cycle carrier (e.g., the "Inverse Edge" carrier shown in FIG. 10) is inserted to transition the carrier from its high (or topmost) location to its low (or bottommost) location, thereby avoiding discontinuities in the PWM carrier waveform. Similarly, if the prior PWM period's carrier ends in a low (or bottommost) location (e.g., the "Inverse Center" carrier shown in FIG. 10), and if the desired ending location of the current PWM period's carrier is a high (or topmost) location (e.g., the "Center" carrier shown in FIG. 10), a non-clamped intermediate duty cycle carrier is inserted to prevent discontinuities in the PWM carrier waveform. For example, where the prior PWM period's carrier ends in a low (or bottommost) location (e.g., the "Inverse Center" carrier shown in FIG. 10), and where the desired ending location of the current PWM period's carrier is a high (or topmost) location (e.g., the "Center" carrier shown in FIG. 10), a non-clamped intermediate duty cycle carrier (e.g., the "Edge" carrier shown in FIG. 10) is inserted to transition the carrier from its low (or bottommost) location to its high (or topmost) location, thereby avoiding discontinuities in the PWM carrier waveform.

As previously-noted, the novel clamping state selection strategy is operable to select a clamping state (positive or negative clamping) and a to-be-clamped phase-leg from among the 3 phase-legs in a manner that further reduce inverter switching losses beyond what is achievable using known DPWM techniques. In some embodiments of the disclosure, the novel clamping state selection strategy is based on a comparison between current amplitude of the candidate phase legs. Based on an observation that the inverter switching losses are directly related to the amplitude of the phase current, the novel clamping state selection strategy clamps the phase with the highest current amplitude to minimize switching losses and maximize efficiency. For example, with reference to the SV hexagon 600 (shown in FIG. 6), in the hexagon sector zero (0), when $|IA|\geq|IC|$, phase A is selected to be clamped to the positive DC rail 402 (shown in FIG. 4), otherwise, phase C is clamped to negative DC rail 404 (shown in FIG. 4). This clamping state selection strategy is shown in Table II (shown in FIG. 8) for all hexagon sectors.

Turning now to a more detailed description of embodiments of the disclosure, FIG. 1 depicts a system 100 embodying aspects of the disclosure. The system 100 includes an energy source 110 electronically coupled to an electric motor drive system 102. In the embodiment depicted in FIG. 1, the electric motor drive system 102 includes an inverter 120, an AC motor 130, and an inverter controller 140, configured and arranged as shown. The inverter controller 140 further includes a clamping state strategy module 142 and a continuous carrier module 144. Although the inverter 120, the AC motor 130, and the inverter controller 140 are depicted as separate components, it is understood that the inverter 120, the AC motor 130, and the inverter controller 140 can be combined in any suitable combination. For example, the inverter controller 140 can be incorporated within the inverter 120; the inverter 120 can be incorporated within the AC motor 130; and/or the inverter 120 and the inverter controller 140 can be incorporated within the AC motor 130.

The energy source 110 can be implemented in a variety of forms, including, for example as a battery. In some embodiments, the battery can be a battery pack having a set of one or more individual battery cells connected in series or in parallel and that operate under the control of one or more controllers, such as a battery control module (BCM) that monitors and controls the performance of the battery pack. The BCM can monitor several battery pack level characteristics such as pack current measured by a current sensor, pack voltage, and pack temperature, for example. The battery pack can be recharged by an external power source (not shown). The battery pack can include power conversion electronics operable to condition the power from the external power source to provide the proper voltage and current levels to the battery pack. The individual battery cells within a battery pack can be constructed from a variety of chemical formulations. Battery pack chemistries can include, but are not limited, to lead acid, nickel cadmium (NiCd), nickel-metal hydride (NIMH), lithium-ion or lithium-ion polymer.

The AC motor 130 can be any electric motor design that is suitable for the work to be performed by the motor. Examples of work that can be done by motors in conventional automobile-based motor applications include operating or moving power windows; power seats; fans for the heater and the radiator; windshield wipers; and/or the engine of a vehicle having a hybrid-electric or pure-electric vehicle configuration. Regardless of the type of the AC motor 130, it relies on electromagnetism and moving magnetic fields to generate mechanical power. A conventional implementation of the AC motor 130 includes four basic parts, namely, a stator; a rotor; a solid axle and coils. The winding of the stator in an AC motor is a ring of electromagnets that are paired up and energized in sequence, which creates the rotating magnetic field. An induction motor often uses a so-called squirrel cage. The squirrel cage in an AC motor is a set of rotor bars connected to two rings, one at either end. The squirrel cage rotor goes inside the stator. When AC power is sent through the stator, it creates an electromagnetic field. The bars in the squirrel cage rotor are conductors, so they respond to the motion of the stator's poles, which rotates the rotor and creates its own magnetic field. Some AC motors use a wound rotor, which is wrapped with wire instead of being a squirrel cage. For a permanent magnetic motor, magnets are mounted on the surface of the rotor core or inserted into the rotor core to produce magnetic fields.

Figure 2:
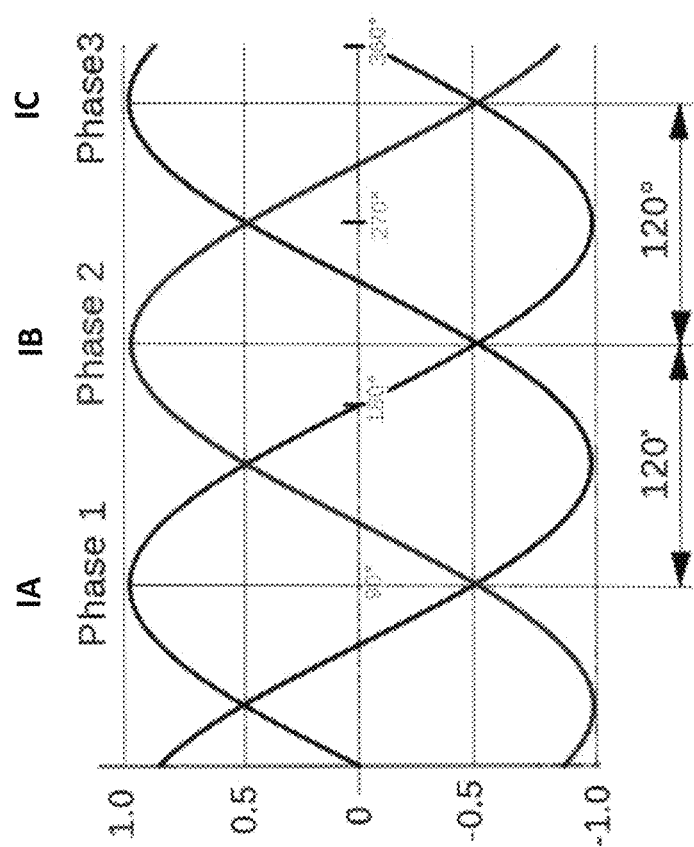
FIG. 2 is a simplified plot illustrating a non-limiting example of a three-phase AC output waveform that can be generated using embodiments of the disclosure.

The inverter 120 is electrically coupled between the energy source 110 and the AC motor 130 to transfer energy from the energy source 110 to the AC motor 130. In embodiments of the disclosure, the inverter 120 is operable to convert the DC voltage received from the energy source 110 to a three-phase AC current as required by the AC motor 130 to function. In embodiments of the disclosure, the inverter 120 can be a three phase full-bridge inverter having six switches organized as three "phase legs." Each phase leg can include two switches connected in series and between a positive DC rail and a negative DC rail. At any given moment, up to three of the inverter switches conduct while the other three inverter switches are open. A phase node can be positioned between the two switches of each phase leg to provide the three phases of a three-phase AC waveform output. An example three phase AC waveform 200 is depicted in FIG. 2. An individual conductor can be coupled to each of the phase nodes to carry AC of the same frequency and voltage amplitude relative to a common reference but with a phase difference of one third of a cycle (i.e., 120 degrees out of phase) between each, as shown in FIG. 2. Due to the phase difference, the voltage on any conductor reaches its peak at one third of a cycle after one of the other conductors and one third of a cycle before the remaining conductor. This phase delay gives constant power transfer to a balanced linear load.

The inverter controller 140 is operable to control, in a novel manner, how the inverter 120 generates the three phase AC waveform at the necessary frequency and amplitude. In embodiments of the disclosure, the inverter controller 140 includes a clamping state strategy module 142 and a continuous carrier module 144 in accordance with aspects of the disclosure. The clamping strategy state module 142 is operable to select a clamping state (positive or negative clamping) and a to-be-clamped phase-leg from among the 3 inverter phase-legs according to a clamping state selection strategy operable to further reduce inverter switching losses beyond what can be achieved using known DPWM techniques. The clamping state selection strategy implemented by the module 142 is applied for each sector of the SV hexagonal star 600 (shown in FIG. 6), which calls for a corresponding selection of a carrier waveform that is matched to the selected clamping state. In some embodiments of the disclosure, the novel clamping state selection strategy is based on a comparison between current amplitude of the candidate phase legs. Based on an observation that the inverter switching losses are directly related to the amplitude of the phase current, the novel clamping state selection strategy clamps the phase with the highest current amplitude to minimize switching losses and maximize efficiency. For example, with reference to the SV hexagon 600 (shown in FIG. 6), in the hexagon sector zero (0), when $|IA| \geq |IC|$, phase A is selected to be clamped to the positive DC rail 402 (shown in FIG. 4), otherwise, phase C is clamped to negative DC rail 404 (shown in FIG. 4). Additional details of how the clamping state strategy 142 can be implemented in accordance with embodiments of the disclosure are depicted in FIGS. 5-11B and described in greater detail subsequently herein.

When the clamping state is selected in accordance with the novel clamping state selection strategy, the inverter controller 140 is operable to use the continuous carrier module 144 to implement a novel continuous carrier alignment methodology that selectively inserts, where needed, a non-clamped intermediate duty cycle carrier between a given carrier waveform transition to ensure that any changes to the carrier waveform occur in a continuous manner. For example, a phase leg clamped to a positive DC rail can require a different carrier waveform than if that same phase leg or another phase leg is clamped to the negative DC rail. If the carrier waveform change is too abrupt (e.g., bringing the waveform from a high (or topmost) location to a low (or bottommost) location in less than a predetermined period of time required by the associated hardware), the physical switching elements may not be able to execute such a change. Accordingly, the novel continuous carrier alignment methodology selectively inserts, where needed, a selected type of a non-clamped intermediate duty cycle carrier between a given carrier waveform transition to avoid abrupt changes that may not be executed by the switching elements, thereby ensuring that any changes to the carrier waveform occur in a continuous manner that can be executed by the switching elements. Additional details of how the continuous carrier module 144 can be implemented in accordance with embodiments of the disclosure are depicted in FIGS. 5-11B and described in greater detail subsequently herein.

Figure 4:
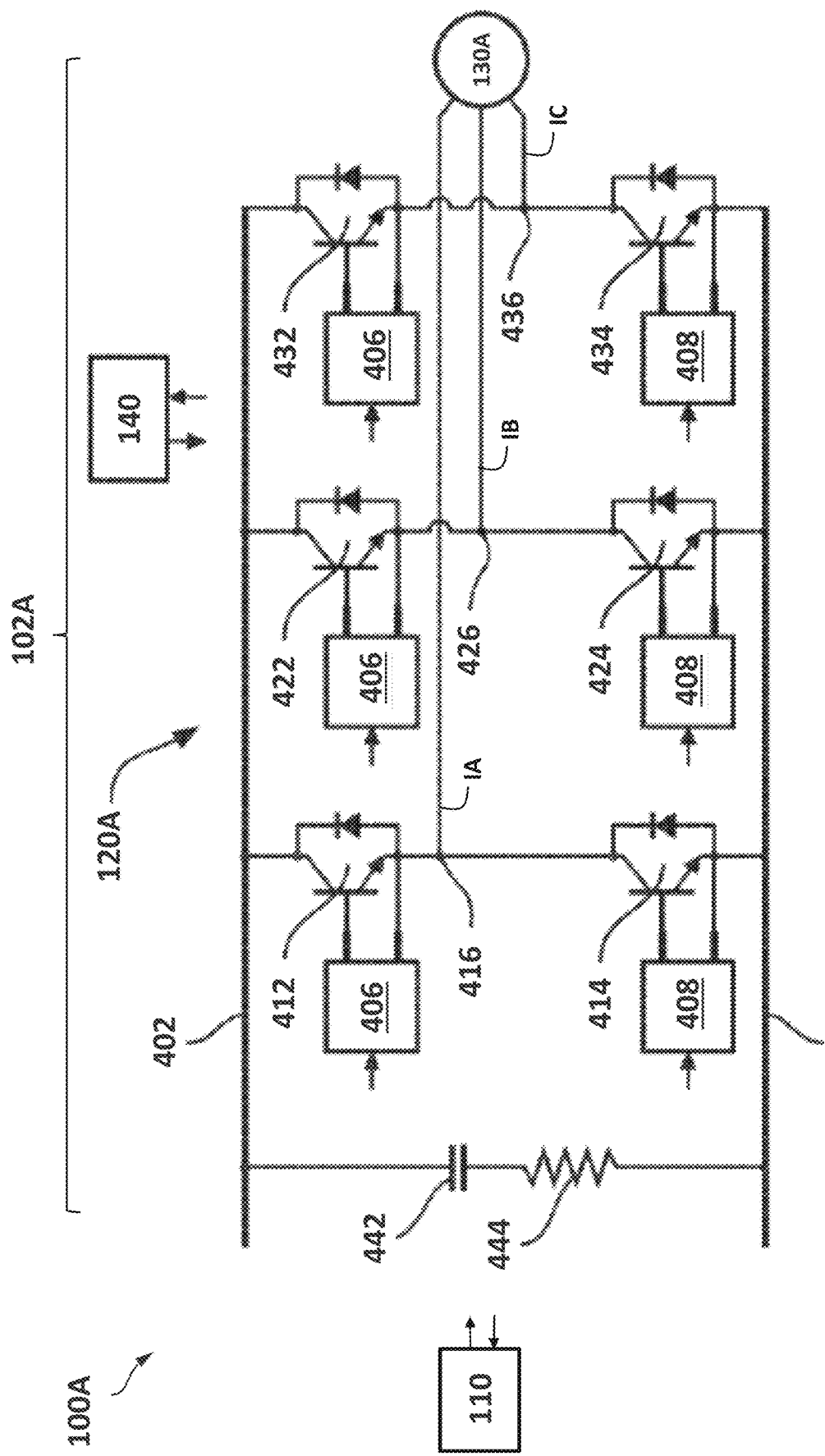
FIG. 4 is a simplified block diagram illustrating a non-limiting example of how an inverter of the electric motor drive system shown in FIG. 1 can be implemented as a voltage source inverter in accordance with aspects of the disclosure.

FIG. 4 depicts a system 100A having the energy source 110 electronically coupled to an electric motor drive system 102A. The system 100A is a non-limiting example implementation of the system 100 (shown in FIG. 1), and the electric motor drive system 102A is a non-limiting example implementation of the electric motor drive system 102 (shown in FIG. 1). The electric motor drive system 102A can be implemented as a voltage source inverter (VSI) 120A electronically coupled to the inverter controller 140 and an electric machine 130A. The electric machine 130A is an example implementation of the AC motor 130 (shown in FIG. 1). Although the VSI 120A, the electric machine 130A, and the inverter controller 140 are depicted as separate components, it is understood that the VSI 120A, the electric machine 130A, and the inverter controller 140 can be configured and arranged in any suitable combination of components. For example, the inverter controller 140 can be incorporated within the VSI 120A; the VSI 120A can be incorporated within the electric machine 130A; and/or the VSI 120A and the inverter controller 140 can be incorporated within the electric machine 130A.

The VSI 120A is electrically connected to a DC bus, which is formed from a positive DC rail 402 and a negative DC rail 404. The VSI 120A is also electrically connected to the electric machine 130A, which can be a multi-phase AC electric motor/generator. The inverter controller 140 can be implemented as a variety of types of computing devices, which include a computer, a microprocessor, a digital signal processor, and the like, configured and operable to execute software commands and programs, and which can include associated firmware, such that the controller is configured and operable to control how the VSI 120A generates three-phase AC waveform (e.g., the three-phase AC waveform 200 shown in FIG. 2). In some embodiments of the disclosure, the inverter controller 140 can also be configured and arranged to include the features and functionality of the computing system 1200 (shown in FIG. 12). The electric machine 140 can be a permanent magnet synchronous device, an induction machine or the like. The VSI 120A electrically connects to the energy source 110 via a positive high-voltage DC power bus (HV+) (i.e., a positive DC rail) 402 and a negative high-voltage DC power bus (HV−) (i.e., a negative DC rail) 404. The energy source 110 can be implemented in a variety of forms, including, for example, a high-voltage DC power source such as a high-voltage battery or a capacitor; a high-voltage electric power generator; and/or another related device or system.

The VSI 120A can include a bus capacitor 442 and a resister 444 operable to provide noise suppression, load balancing, and the like. The VSI 120A includes a plurality of switches 412, 414, 422, 424, 432, 434 organized in switch pairs that include an upper switch (e.g., upper switch 412) in series with a lower switch (e.g., lower switch 414) and separated by a phase node (e.g., first phase node 416). More specifically, upper switch 412 and lower switch 414 are electrically connected at a first phase node 416 and in series with one another between HV+402 and HV−404; upper switch 422 and lower switch 424 are electrically connected at a second phase node 426 and in series with one another between HV+402 and HV−404; and upper switch 432 and lower switch 434 are electrically connected at third phase node 436 and in series with one another between HV+402 and HV−404. Each of the upper/lower switch pairs 412 and 414, 422 and 424, and 432 and 434 defines a phase leg of the VSI 120A and corresponds to a phase of the electric machine 130A. The nodes 416, 426 and 436 electrically connect to nominal first, second and third phases of the electric machine 130A to transfer electric power thereto.

The upper switches 412, 422, 432 are referred to as high-side switches, and the lower switches 414, 424, 434 are referred to as low-side switches. A first, high-side gate drive circuit 406 controls activation and deactivation of the first, high-side switches 412, 422 and 432, and a second, low-side gate drive circuit 408 controls activation and deactivation of the second, low-side switches 414, 424 and 434. The first, high-side gate drive circuit 406 and the second, low-side gate drive circuit 408 include any suitable electronic device capable of activating and deactivating the upper/lower switches 412 and 414, 422 and 424, and 432 and 434 to cause power transfer between one of HV+402 and HV−404 and a phase of the electric machine 130A in response to control signals originating at the inverter controller 140. The inverter controller 140 generates control signals that are communicated to the first, high-side gate drive circuit 406 and the second, low-side gate drive circuit 408 to activate and deactivate the upper/lower switches 412 and 414, 422 and 424, and 432 and 434 in response to an inverter switch control mode.

Each of the upper, high-side switches 412, 422 and 432 and the lower, low-side switches 414, 424 and 434 can be controlled (e.g., through command signals from the controller 140 applied to the drive circuits 406, 408) to either an ON state or an OFF state. Each of the phase legs formed by the upper/lower switch pairs 412 and 414, 422 and 424, and 432 and 434 can be controlled to a control state of one (1) or zero (0). A control state of one (1) for one of the phase legs corresponds to activation of one of the upper, high-side switches 412, 422 and 432 with a corresponding lower, low-side switch 414, 424 or 434, respectively, deactivated (e.g., as shown at 310 in FIG. 3). A control state of zero (0) for one of the phase legs corresponds to activation of one of the lower, low-side switches 414, 424 and 434 with corresponding upper, high-side switch 412, 422 or 432, respectively, deactivated (e.g., as shown at 320 of FIG. 3). Each of the upper, high-side switches 412, 422 and 432 is preferably configured as a normally-OFF switch, meaning that the switch conducts electrical current only when activated by the first, high-side gate drive 406. In one example, the upper, high-side switches 412, 422 and 432 are insulated gate bipolar transistors (IGBTs) each having a diode arranged in parallel. The first, high-side gate drive 406 activates each of the upper, high-side switches 412, 422 and 432 to cause current flow thereacross responsive to the selected inverter switch control mode. Each of the lower, low-side switches 414, 424 and 434 is typically configured as a normally-OFF switch, meaning that the switch conducts electrical current only when activated by the second, low-side gate drive 408. The lower, low-side switches 414, 424 and 434 can be any suitable normally-OFF semiconductor switch, including, e.g., IGBT switches each having a diode arranged in parallel. During operation, the first, high-side gate drive circuit 406 and the second, low-side gate drive circuit 408 generate activation signals to activate and deactivate the upper, high-side switches 412, 422 and 432 and the lower, low-side switches 414, 424 and 434 to operate the electric machine 130A to generate torque. The VSI 120A electrically operatively connects to the electric machine 130A in that the action of selectively activating and deactivating the upper/lower switches 412 and 414, 422 and 424, and 432 and 434 to cause power transfer between one of HV+402 and HV−404 and a phase of the multi-phase electric machine 130A in response to control signals originating at the inverter controller 120A induces a magnetic field in an element of a stator of the electric machine 130A that acts on an element of the rotor to urge movement of the rotor within the stator, thus inducing torque in a shaft member mechanically coupled to the rotor.

The inverter controller 120A monitors signal inputs from sensors (not shown separately from the electric machine 130A), such as a rotational position sensor and voltage and/or current sensors, and selectively controls operation of the VSI 120A to perform a novel carrier-based SV-DPWM scheme in accordance with aspects of the disclosure. The novel carrier-based SV-DPWM includes performing the functionality associated with the clamping state strategy module 142 and the continuous carrier module 144. Additional details of how the clamping state strategy module 142 and the continuous carrier module 144 can be implemented in accordance with embodiments of the disclosure are depicted in FIGS. 5-11B and described in greater detail below.

Figure 5:
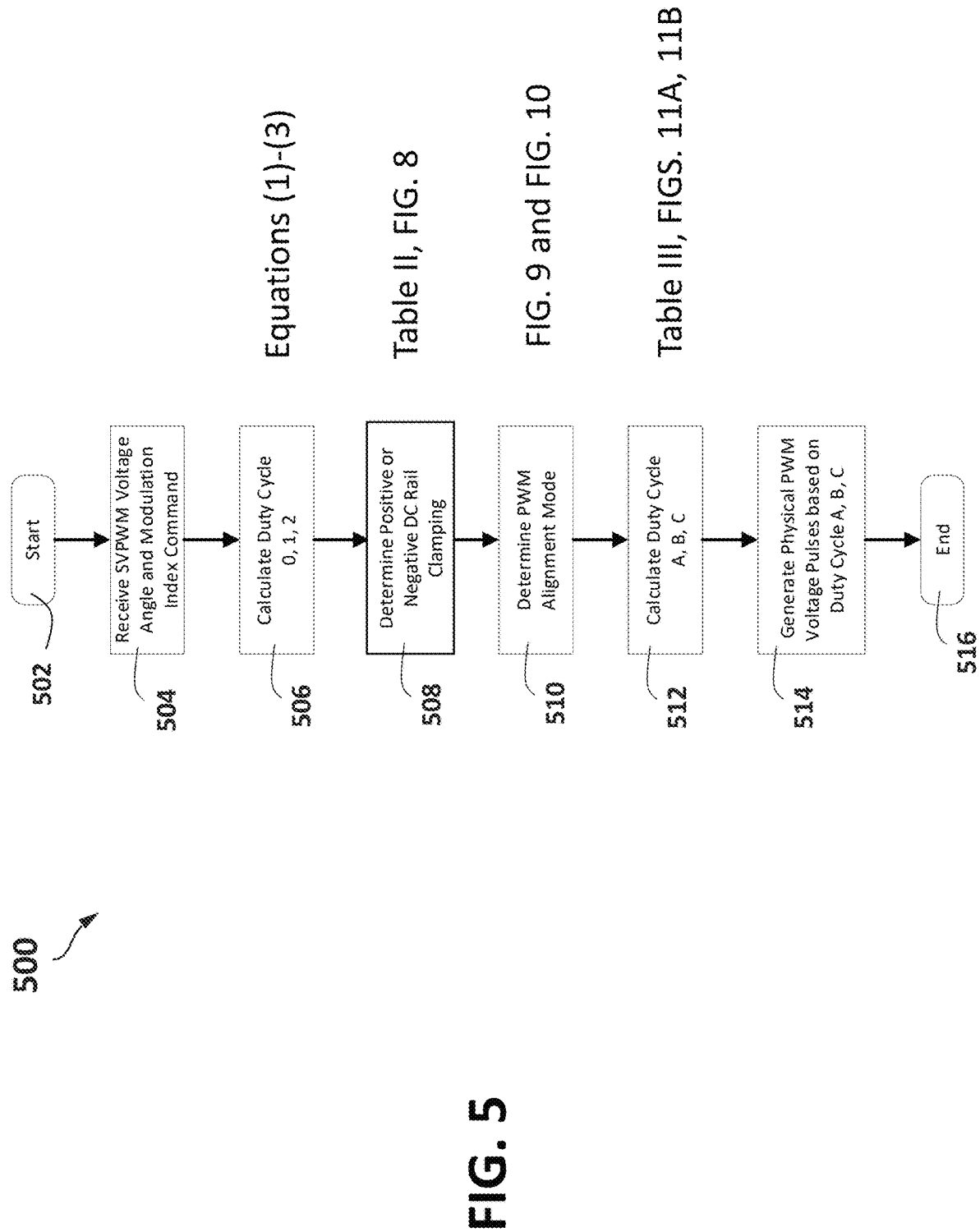
FIG. 5 is a simplified flow diagram illustrating a computer-implemented methodology that can be implemented using an inverter controller of the electric motor drive system shown in FIGS. 1 and 4 in accordance with embodiments of the disclosure.
Figure 6:
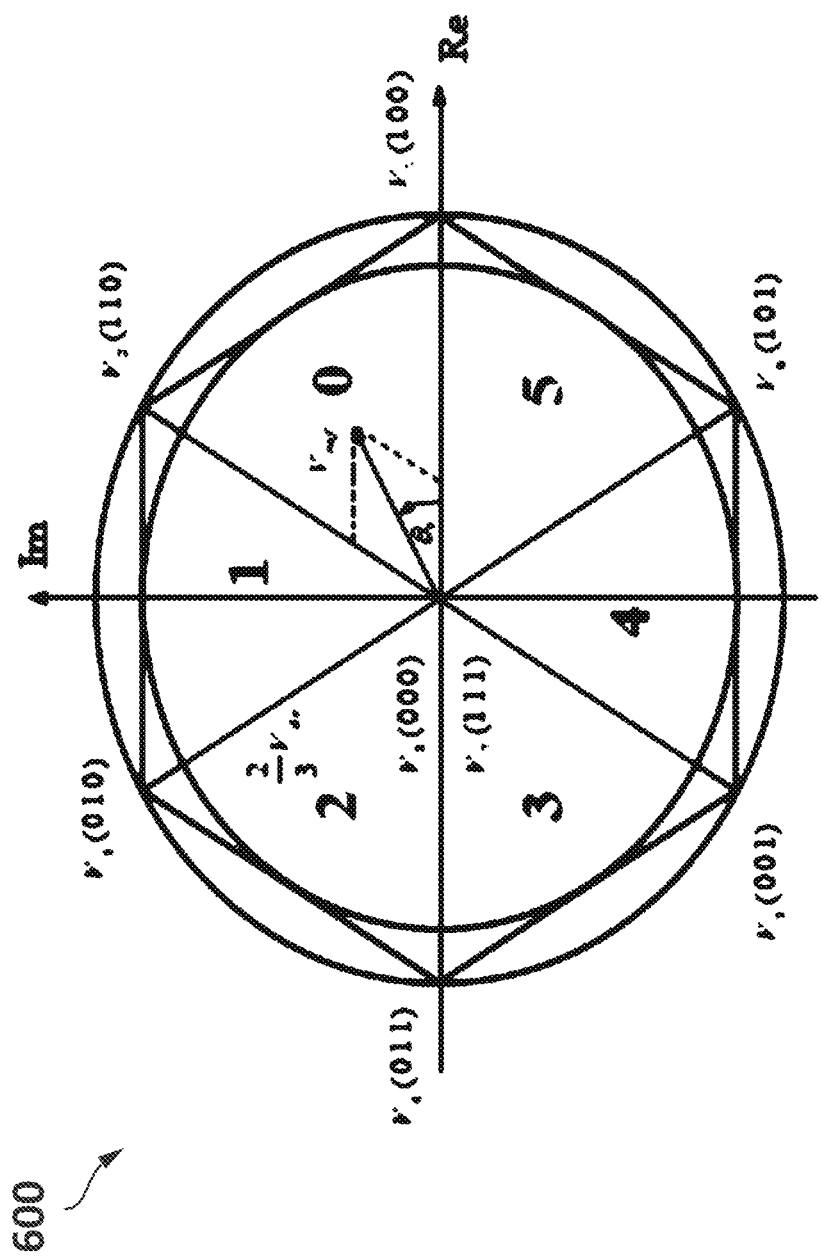
FIG. 6 is a simplified hexagonal star diagram illustrating a space vector pulse width modulation (SV-PWM) technique that can be used in performing portions of the computer-implemented methodology shown in FIG. 5.

FIG. 5 is a simplified flow diagram illustrating a computer-implemented methodology 500 that can be implemented using the inverter controller 120, 120A (shown in FIGS. 1 and 4) of the electric motor drive system 102, 102A (shown in FIGS. 1 and 4). The methodology 500 is a non-limiting example implementation of the novel carrier-based SV-DPWM scheme described herein in accordance with aspects of the disclosure and includes functionality performed by the clamping state strategy module 142 and the continuous carrier module 144. The methodology 500 begins at block 502, and then moves to block 504 where the inverter controller 140 receives the SV-PWM voltage angle and the modulation index command. In general, the voltage angle is essentially the phase of the voltage, and the modulation index (or modulation depth) of a modulation scheme describes by how much the modulated variable of the carrier signal varies around its unmodulated level. At block 506, the methodology 500 uses the values received or accessed at block 504 (where MI is the modulation index; and $\ominus v$ is the SV-PWM voltage angle) and Equations (1)-(3) shown in FIG. 7 to compute the duty cycles $D_0$, $D_1$, $D_2$. Referring to the SV-PWM hexagonal star diagram 600 depicted in FIG. 6, traditional SV-PWM operates in the stationary reference frame on a 3-phase 2-level VSI (e.g., VSI 120A shown in FIG. 4)). When implementing traditional SV-PWM, a control voltage vector, $V_{ref}$ rotates within the PWM voltage limit hexagon 600. The vectors from the center of the hexagon 600 to each vertex of the hexagon 600 represent the magnitude and phase of the stationary frame voltage applied for all possible active switching states of the inverter (labeled $V_1$ through $V_6$). The center of the hexagon 600 represents a zero voltage output of the inverter (e.g., VSI 120A shown in FIG. 4) and is achieved when all three phases are tied to the lower DC voltage rail 404 (shown in FIG. 4) (i.e., $V_0$=(000) shown at 320 in FIG. 3) or all three phases are tied to the upper DC voltage rail 402 (shown in FIG. 4) (i.e., $V_7$=(111) shown at 310 in FIG. 3). These states are labeled $V_0$ and $V_7$ in FIG. 6, respectively. By projecting $V_{ref}$ onto the two adjacent switch state vectors $V_1$, $V_2$ as shown in FIG. 6, the ratio of time spent in the adjacent switching states with respect to the duration of the entire PWM period are the duty cycles $D_0$, $D_1$, $D_2$ and can be determined using Equations (1)-(3) shown in FIG. 7.

At block 508, the methodology 500 determines the phase leg of the inverter (e.g., inverter 120A shown in FIG. 4) that will be clamped for the novel version of DPWM, and further determines whether the selected to-be-clamped phase leg will be clamped to the positive DC rail (e.g., positive DC rail 402 shown in FIG. 4) or the negative DC rail (e.g., the negative DC rail 404 shown in FIG. 4). In embodiments of the disclosure, the operations at block 508 correspond to operations performed by the clamping state strategy module 142 (shown in FIG. 1). Traditional CPWM applies the $D_0$, $D_1$ and $D_2$ duty cycles calculated using Equations (1)-(3) (shown in FIG. 7) to each phase such that all three (3) inverter phases undergo switching state changes when operating using CPWM. Also, when operating using CPWM both zero voltage states ($V_0$, $V_7$) are utilized each PWM period. In accordance with aspects of the disclosure, to reduce switching losses from CPWM, one of the phases can be clamped to either the positive DC rail (e.g., DC rail 402 shown in FIG. 4) or the negative DC rail (e.g., DC rail 404 shown in FIG. 4) of the inverter (e.g., VSI 120A) for the entire PWM period. In this case, only two (2) of the three (3) phases (i.e., A, B, or C shown at Table I 330 in FIG. 3) are switched, and only one (1) of the zero vectors (i.e., $V_0$ or $V_7$) is utilized per PWM period. Within each hexagon sector (sectors 0, 1, 2, 3, 4, 5 shown in FIG. 6), there is one (1) phase that must be switched. For example, in the hexagon sector zero (0), because the adjacent hexagon vertices are $V_1$ (100) and $V_2$ (110), phase B must be switched. This leaves an option to either clamp phase A to the positive DC voltage rail for the entire PWM period (and subsequently utilize $V_7$ as the zero vector state) or clamp phase C to the negative DC voltage rail for the entire PWM period (and subsequently utilize $V_0$ as the zero vector state). Because the switching losses are directly related to the amplitude of the phase current (IA, IB, or IC shown in FIGS. 2 and 4), the clamping state strategy module 142 (shown in FIG. 1) is operable to determine the phase with the highest current amplitude and clamp the phase leg (i.e., the phase leg will not turn on or off during the PWM period) associated with the highest phase current amplitude as a scheme to minimize switching losses and maximize efficiency. For example, in the hexagon sector zero (0), when $|IA| \geq |IC|$, phase A is selected to be clamped to the positive DC rail, otherwise, phase C is clamped to the negative DC rail. This clamping state selection strategy is shown in Table II of FIG. 8 for all hexagon sectors.

At block 510, the methodology 500 uses the clamping state selection determined at block 508 to determine the PWM alignment mode (PWM-AM). In embodiments of the disclosure, the PWM-AM refers to the carrier waveform that will be used to perform a novel "continuous carrier" implementation of carrier-based DPWM. As previously noted, carrier-based PWM is a modulation scheme that provides low harmonic distortion characteristics and simple implementation by comparing a reference (or control) signal to a carrier (or modulation) signal in each phase leg of the inverter. Every time these two signals (reference/carrier) cross, the associated inverter switching element is turned on or off. The carrier signal is typically either a saw tooth or a triangular signal with the desired switching frequency. In conventional carrier-based PWM implementations, one triangular carrier signal is used to modulate all three phase legs in a three-phase VSI because its symmetrical switching sequence results in lower power losses and lower THD. However, for embodiments of the disclosure where the novel clamping state determination performed at block 508 results in a change to the clamping state, a non-clamped intermediate duty cycle carrier is inserted to prevent discontinuities in the carrier waveform used in the PWM scheme. When inserting a non-clamped intermediate duty cycle carrier to prevent undesirable PWM pulses, specific PWM carrier alignment modes are manipulated based on the clamping status. These alignment modes are depicted in FIG. 10, and the alignment determination strategy can be implemented using the methodology 900 shown in FIG. 9. In embodiments of the disclosure, the methodology 900 can be performed by the continuous carrier module 144 shown in FIG. 1.

The PWM-AMs utilized in aspects of the disclosure will now be described with reference to FIG. 10. FIG. 10 is organized in four (4) quadrants, identified as Q1, Q2, Q3, and Q4. Each quadrant Q1, Q2, Q3, Q4 depicts a leftmost diagram and a rightmost diagram. The leftmost diagram plots the movement of the Reference signal (i.e., Duty Cycles) and the Carrier signal for each phase A, B, C over time (i.e., over the duration of the given PWM period); and the rightmost diagram plots the corresponding on/off state for each phase A, B, C over time (i.e., over the duration of the given PWM period). The diagrams depicted in FIG. 10 provide examples of the carrier waveforms and what would be the corresponding on/off state when random duty cycles are provided. In the leftmost diagram, when the Reference is higher than the Carrier, the corresponding phase is on (conducting), and when the Reference is lower than the Carrier, the corresponding phase is off (non-conducting). This relationship defines the duty cycle of the given phase and is reflected by the duty cycle(s) shown in the rightmost diagram. In Q1, the PWM-AM is identified as a "Center" PWM-AM. In Q2, the PWM-AM is identified as an "Inverse Center" PWM-AM. In Q3, the PWM-AM is an intermediate duty cycle carrier identified as an "Edge" PWM-AM. In Q4, the PWM-AM is an intermediate duty cycle carrier identified as an "Inverse Edge" PWM-AM. A phase leg clamped to a positive DC rail can require a different carrier waveform than if that same phase leg or another phase leg is clamped to the negative DC rail. If the carrier waveform change is too abrupt (e.g., bringing the carrier waveform from a high (or topmost) location to a low (or bottommost) location in less than a predetermined period of time required by the associated hardware), the physical switching elements may not be able to execute such a change. Accordingly, block 510 and the methodology 900 (shown in FIG. 9 and described in greater detail below) selectively insert, where needed, a selected type of non-clamped intermediate duty cycle carrier (Edge, Inverse Edge) between a given carrier waveform transition to avoid abrupt changes that cannot be executed by the switching elements, thereby ensuring that any changes to the carrier waveform occur in a continuous manner that can be executed by the switching elements.

Using the clamping state selection determined at block 508, at block 510, the continuous carrier module 144 (shown in FIG. 1) of the inverter controller 140 (shown in FIG. 1) determines the ending location of the carrier waveform from the prior PWM period, and further determines the desired ending location of the carrier waveform for the current PWM period. If the prior PWM period's carrier waveform ends in a high (or topmost) location (e.g., the "Center" carrier waveform shown in FIG. 10), and if the desired ending location for the current PWM period's carrier waveform is a high (or topmost) location (e.g., the "Center" carrier shown in FIG. 10), no non-clamped intermediate duty cycle carrier is inserted. Similarly, if the prior PWM period's carrier ends in a low (or bottommost) location (e.g., the "Inverse Center" carrier shown in FIG. 10), and if the desired ending location of the current PWM period's carrier waveform is a low (or bottommost) location (e.g., the "Inverse Center" carrier shown in FIG. 10), no intermediate duty cycle carrier is inserted. However, if the prior PWM period's carrier ends in a high (or topmost) location (e.g., the "Center" carrier shown in FIG. 10), and if the desired ending location of the current PWM period's carrier waveform is a low (or bottommost) location (e.g., the "Inverse Center" carrier shown in FIG. 10), a non-clamped intermediate duty cycle carrier is inserted to prevent discontinuities in the PWM carrier waveform. For example, where the prior PWM period's carrier ends in a high (or topmost) location (e.g., the "Center" carrier shown in FIG. 10), and where the desired ending location of the current PWM period's carrier is a low (or bottommost) location (e.g., the "Inverse Center" carrier shown in FIG. 10), a non-clamped intermediate duty cycle carrier (e.g., the "Inverse Edge" carrier shown in FIG. 10) is inserted to transition the carrier from its high (or topmost) location to its low (or bottommost) location, thereby avoiding discontinuities in the PWM carrier waveform. Similarly, if the prior PWM period's carrier ends in a low (or bottommost) location (e.g., the "Inverse Center" carrier shown in FIG. 10), and if the desired ending location of the current PWM period's carrier is a high (or topmost) location (e.g., the "Center" carrier shown in FIG. 10), a non-clamped intermediate duty cycle carrier is inserted to prevent discontinuities in the PWM carrier waveform. For example, where the prior PWM period's carrier ends in a low (or bottommost) location (e.g., the "Inverse Center" carrier shown in FIG. 10), and where the desired ending location of the current PWM period's carrier is a high (or topmost) location (e.g., the "Center" carrier shown in FIG. 10), a non-clamped intermediate duty cycle carrier (e.g., the "Edge" carrier shown in FIG. 10) is inserted to transition the carrier from its low (or bottommost) location to its high (or topmost) location, thereby avoiding discontinuities in the PWM carrier waveform.

Figure 9:
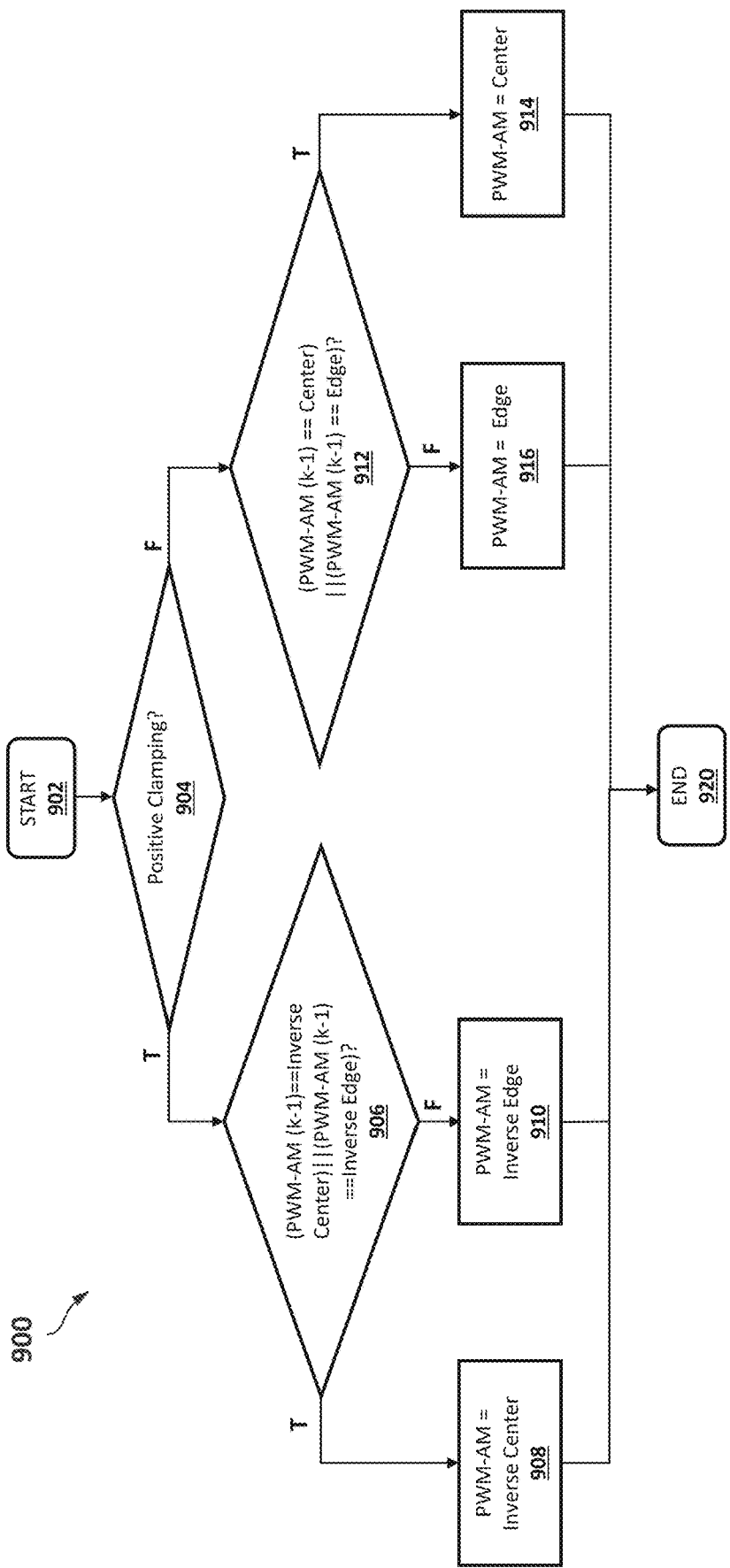
FIG. 9 is a simplified flow diagram illustrating a PWM alignment mode selection methodology for preventing discontinuities in the PWM waveform, wherein the PWM alignment mode strategy can be part of the computer-implemented methodology shown in FIG. 5 in accordance with embodiments of the disclosure.
Figure 10:
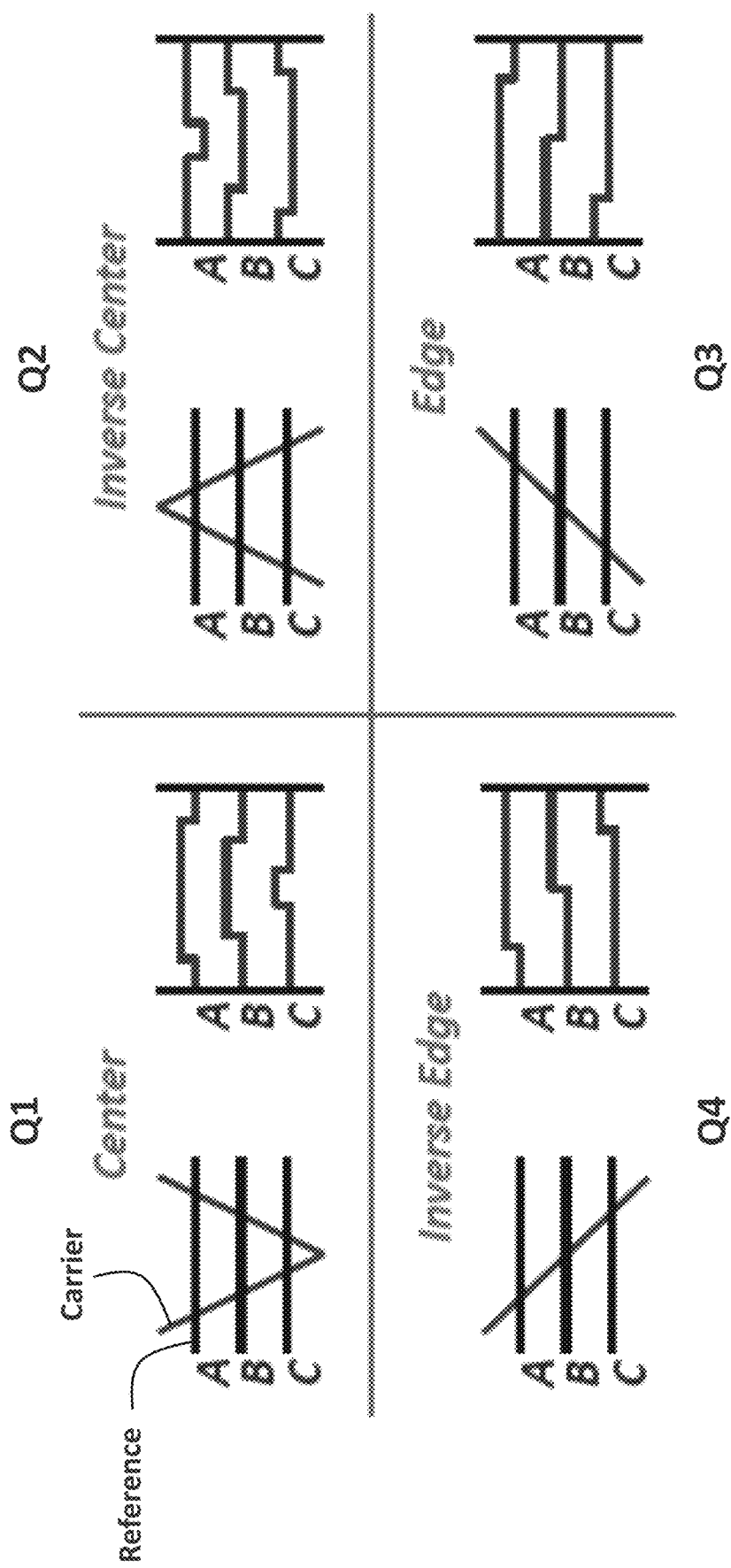
FIG. 10 is a set of simplified diagrams illustrating PWM alignment mode options used to implement the PWM alignment mode selection methodology shown in FIG. 9 in accordance with embodiments of the disclosure.

FIG. 9 depicts a non-limiting example methodology 900 that can be used to implement the above-described alignment determination strategy applied at block 510 of the methodology 500 (shown in FIG. 5) using the continuous carrier module 144 (shown in FIG. 1). The methodology 900 begins at block 902, and then moves to decision block 904 where an inquiry is made as to whether not, for the current PWM period, block 508 of the methodology 500 has selected positive clamping for the to-be-clamped phase leg (e.g., as shown in Table II of FIG. 8). If answer to the inquiry at decision block 904 is true (T), positive clamping was selected at block 508 of the methodology 500, which means that the carrier would ordinarily be Inverse Center. Decision block 906 evaluates whether or not the PWM-AM in the previous sampling (k−1, where k is the current sampling) is Inverse Center or Inverse Edge, both of which end in a low (or bottommost) location. If answer to the inquiry at decision block 906 is true (T), block 908 determines that the PWM-AM for the current sampling k should be Inverse Center, which begins in a low (or bottommost) location, thereby providing a continuous carrier when moving from k−1 sampling to k sampling. If the answer to the inquiry at decision block 906 is false (F), the PWM-AM in the previous sampling k−1 is neither Inverse Center nor Inverse Edge, which means the k−1 carrier ended in a high (or topmost) location. With the k−1 carrier ending in a high (or topmost) location, block 910 determines that the PWM-AM for the current sampling k should be Inverse Edge, which begins in a high (or topmost) location, thereby providing a continuous carrier when moving from k−1 sampling to k sampling. The Inverse Edge PWM-AM also ends in a low (or bottommost) location. This sets up for the next sample instant assuming that decision block 904 will come back TRUE again. Thus, decision block 906 was F at (k), but would be expected to return T at (k+1).

Returning to decision block 904, if answer to the inquiry at decision block 904 is false (F), negative clamping was selected at block 508 of the methodology 500, which means that the carrier would ordinarily be Center. Decision block 912 evaluates whether or not the PWM-AM in the previous sampling k−1 is Center or Edge, both of which end in high (or topmost) locations. If answer to the inquiry at decision block 912 is true (T), block 914 determines that the PWM-AM for the current sampling k should be Center, which begins in a high (or topmost) location, thereby providing a continuous carrier when moving from k−1 sampling to k sampling. If the answer to the inquiry at decision block 912 is false (F), the PWM-AM in the previous sampling k−1 is neither Center nor Edge, which means the k−1 carrier ended in a low (or bottommost) location. With the k−1 carrier ending in a low (or bottommost) location, block 916 determines that the PWM-AM for the current sampling k should be Edge, which begins in a low (or bottommost) location, thereby providing a continuous carrier when moving from k−1 sampling to k sampling. The Edge PWM-AM also ends in a high (or topmost) location. This sets up for the next sample instant assuming that decision block 904 will come back FALSE again. Thus, where decision block 912 was F at (k), but would be expected to return T at (k+1). From any one of blocks 908, 910, 914, 916, the methodology 900 moves to block 920 and ends.

Returning now to the methodology 500 shown in FIG. 5, subsequent to block 510, at block 512, the methodology 500 applies the duty cycles $D_0$, $D_1$, $D_2$ computed at block 506 to each phase A, phase B, and phase C, according to Table III shown in FIGS. 11A, 11B. At block 514, the inverter controller 140 uses the computations at Table III to generate PWM voltages to control the inverter 120, 120A to generate an AC waveform with minimized switching losses (beyond what is available through traditional DPWM) and continuous carrier transitions that avoid malfunctions that would occur from switching carrier waveforms in less time than is required by the associated switching hardware. More specifically, as shown under the column "Duty Cycle X," the duty cycles $D_0$, $D_1$, $D_2$ are applied taking into account the hexagonal sector, the PWM-AM that results from the continuous carrier module 144 (shown in FIG. 1), and the results of the clamping state selection analysis performed by the clamping state selection module 142 (shown in FIG. 1).

FIGS. 11C and 11D depict Table IV, which is an example of a starting point for determining the duty cycles A, B, C shown under the column "Duty Cycle X" in FIGS. 11A and 11B in accordance with aspects of the disclosure. Table IV of FIGS. 11C and 11D shows CPWM calculation of Duty Cycle A, B, C using Equations (1)-(3) (shown in FIG. 7) based on the 6 different hexagon sectors. For DPWM, the strategy used to generate Table IV (shown in FIGS. 11C and 11D) is modified as Table III (shown in FIGS. 11A, 11B) to be compatible with positive and negative rail clamping. Using sector zero (0) (Case 0) as an example, it can be observed from Table III that, when clamping to the negative rail is needed, Duty cycle C should be always zero (0) instead of $0.5*D_0$, Duty Cycle B=$D_2$+Duty Cycle C(0)=$D_2$. Duty Cycle A is still equal to Duty Cycle B+$D_1$. Similarly, when clamping to positive rail is needed, Duty Cycle A should be always 1 instead of Duty Cycle B+$D_1$, Duty Cycle B and C should be calculated from Duty Cycle A, then Duty Cycle B becomes Duty Cycle A (1)-$D_1$, and Duty Cycle C is Duty Cycle B-$D_2$. When a non-clamped intermediate duty cycle carrier (Edge and Inverse Edge) is inserted, as there is no clamping, the CPWM Duty Cycle calculation can still be used.

FIG. 12 illustrates an example of a computer system 1200 that can be used to implement the computer-based components in accordance with aspects of the disclosure. The computer system 1200 includes an exemplary computing device ("computer") 1202 configured for performing various aspects of the content-based semantic monitoring operations described herein in accordance aspects of the disclosure. In addition to computer 1202, exemplary computer system 1200 includes network 1214, which connects computer 1202 to additional systems (not depicted) and can include one or more wide area networks (WANs) and/or local area networks (LANs) such as the Internet, intranet(s), and/or wireless communication network(s). Computer 1202 and additional system are in communication via network 1214, e.g., to communicate data between them.

Exemplary computer 1202 includes processor cores 1204, main memory ("memory") 1210, and input/output component(s) 1212, which are in communication via bus 1203. Processor cores 1204 includes cache memory ("cache") 1206 and controls 1208, which include branch prediction structures and associated search, hit, detect and update logic, which will be described in more detail below. Cache 1206 can include multiple cache levels (not depicted) that are on or off-chip from processor 1204. Memory 1210 can include various data stored therein, e.g., instructions, software, routines, etc., which, e.g., can be transferred to/from cache 1206 by controls 1208 for execution by processor 1204. Input/output component(s) 1212 can include one or more components that facilitate local and/or remote input/output operations to/from computer 1202, such as a display, keyboard, modem, network adapter, etc. (not depicted).

A cloud computing system 50 is in wired or wireless electronic communication with the computer system 1200. The cloud computing system 50 can supplement, support or replace some or all of the functionality (in any combination) of the computer system 1200. Additionally, some or all of the functionality of the computer system 1200 can be implemented as a node of the cloud computing system 50.

Accordingly, it can be seen from the foregoing detailed description that embodiments of the disclosure provide a novel inverter control methodology for efficiently and effectively controlling the inverter switching and modulation operations that are used to generate alternating current (AC) in an electric motor drive system. More specifically, embodiments of the disclosure provide improvements over known DPWM schemes. In general, DPWM can be implemented in an electric motor drive system to reduce switching losses because, using DPWM, only two (2) switches are turned on and off over one switching period compared to three (3) switches that can be turned on and off over one switching period when using CPWM. In the novel inverter control methodology, in each of the SVPWM hexagon sectors, by comparing the current amplitude of two (2) of the three (3) phases, the DPWM zero voltage vector is determined to be clamped to either the positive or negative DC rail to minimize switching losses and maximize the efficiency of the inverter. Furthermore, when switching the clamping mode, the PWM carrier alignment is manipulated in accordance with embodiments of the disclosure to ensure continuous switch states.

To reduce switching losses from CPWM strategies, embodiments of the disclosure clamp one of the phases to either the positive or negative DC rail for the entire PWM period. In this case, only two (2) of the three (3) phases (i.e., A, B, or C) are switched and only one of the zero vectors (i.e., $V_0$ or $V_7$) is utilized per PWM period. Within each SVPWM hexagon sector, there is one phase that must be switched. For example, in the hexagon sector zero (0), because the adjacent hexagon vertices are $V_1$ (100) and $V_2$ (110), phase B must be switched. This leaves an option to either clamp phase A to the positive DC voltage rail for the entire PWM period (and subsequently utilize $V_7$ as the zero (0) vector state) or clamp phase C to the negative DC voltage rail for the entire PWM period (and subsequently utilize $V_0$ as the zero (0) vector state). Taking advantage of an observation by the inventors that the switching losses are directly related to the amplitude of the phase current, clamping the phase with the highest current amplitude can be utilized in accordance with aspects of the disclosure to minimize switching losses and maximize efficiency. For example, in the hexagon sector zero (0), when |IA|≥|IC|, phase A is selected to be clamped to the positive DC rail. Otherwise, phase C is clamped to the negative DC rail. This selection strategy is shown in Table II for all hexagon sectors.

In addition to the clamping state determination, when there is a clamping state change, a non-clamped intermediate duty cycle carrier is inserted to prevent discontinuities in the PWM waveforms. When inserting an intermediate duty cycle carrier, to prevent undesirable PWM pulses, specific PWM carrier alignment modes are manipulated based on clamping status. These alignment modes are depicted in FIG. 10, and the alignment determination strategy is shown in FIG. 9. The complete DPWM strategy is realized by determining the PWM clamping using Table II (shown in FIG. 8), and the PWM carrier alignment using FIG. 9, and applying the $D_0$, $D_1$ and $D_2$ calculated in Equations (1)-(3) to each phase according to Table III (shown in FIGS. 11A and 11B).

Many of the functional units of the systems described in this specification have been labeled as modules. Embodiments of the disclosure apply to a wide variety of module implementations. For example, a module can be implemented as a hardware circuit including custom VLSI circuits or gate arrays, off-the-shelf semiconductors such as logic chips, transistors, or other discrete components. A module can also be implemented in programmable hardware devices such as field programmable gate arrays, programmable array logic, programmable logic devices or the like. Modules can also be implemented in software for execution by various types of processors. An identified module of executable code can, for instance, include one or more physical or logical blocks of computer instructions which can, for instance, be organized as an object, procedure, or function. Nevertheless, the executables of an identified module need not be physically located together, but can include disparate instructions stored in different locations which, when joined logically together, function as the module and achieve the stated purpose for the module.

The various components/modules/models of the systems illustrated herein are depicted separately for ease of illustration and explanation. In embodiments of the disclosure, the functions performed by the various components/modules/models can be distributed differently than shown without departing from the scope of the various embodiments of the disclosure describe herein unless it is specifically stated otherwise.

Various embodiments of the disclosure are described herein with reference to the related drawings. Alternative embodiments of the disclosure can be devised without departing from the scope of this disclosure. Various connections and positional relationships (e.g., over, below, adjacent, etc.) are set forth between elements in the following description and in the drawings. These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

Aspects of the disclosure can be embodied as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the claims.

What is claimed is:

1. An inverter controller operable to perform inverter controller operations comprising:
performing a continuous carrier alignment methodology on an inverter comprising multiple phase legs, the continuous carrier alignment methodology comprising:
for a current sampling period, evaluating a shape of a carrier waveform from a prior sampling period;
based at least in part on an ending location of the carrier waveform from the prior sampling period and a result of comparison of current amplitudes associated with the multiple phase legs, making a determination whether or not to insert an intermediate carrier shape into the carrier waveform during the current sampling period; and
performing a clamping state selection methodology comprising selecting one of the multiple phase legs as a to-be-clamped phase leg based at east in part on the comparison of current amplitudes associated with the multiple phase legs.

2. The inverter controller of claim 1, wherein the inverter controller operations further comprise computing a three-phase duty cycle based at least in part on the carrier waveform of the current sampling period.

3. The inverter controller of claim 1, wherein the ending location of the carrier waveform from the prior sampling period is substantially the same as a starting location of the carrier waveform during the current sampling period.

4. The inverter controller of claim 3, wherein the determination whether or not to insert the intermediate carrier shape comprise a determination to not insert the intermediate carrier shape into the carrier waveform during the current sampling period.

5. The inverter controller of claim 1, wherein the ending location of the carrier waveform from the prior sampling period is different from a starting location of the carrier waveform during the current sampling period.

6. The inverter controller of claim 5, wherein the determination whether or not to insert the intermediate carrier shape comprise a determination to insert the intermediate carrier shape into the carrier waveform during the current sampling period.

7. The inverter controller of claim 6, wherein the ending location of the carrier waveform from the prior sampling period is substantially the same as a starting location of the intermediate carrier shape.

8. The inverter controller of claim 7, wherein an ending location of the intermediate carrier shape is substantially the same as the starting location of the carrier waveform during the current sampling period.

9. The inverter controller of claim 1, wherein the clamping state selection methodology further comprises dynamically selecting the clamping state and the to-be-clamped phase leg based on a sector-by-sector analysis of a space vector hexagon.

10. The inverter controller of claim 9, wherein clamping state selection methodology utilizes a control logic that adapts the clamping strategy in real time according to at least one of instantaneous power processed by a load or predicted losses across transistors of each of the multiple phase legs.

11. A controller-implemented method comprising:
performing, using a processor of a controller, a continuous carrier alignment methodology on an inverter comprising multiple phase legs, the continuous carrier alignment methodology comprising:
for a current sampling period, evaluating a shape of a carrier waveform from a prior sampling period;
based at least in part on an ending location of the carrier waveform from the prior sampling period and a result of a comparison of current amplitudes associated with the multiple phase legs, determining whether or not to insert an intermediate carrier shape into the carrier waveform during the current sampling period; and
performing a clamping state selection methodology comprising selecting one of the multiple phase legs as a to-be-clamped phase leg based at least in part on the comparison of current amplitudes associated with the multiple phase legs.

12. The controller-implemented methodology of claim 11 further comprising computing a three-phase duty cycle based at least in part on the carrier waveform of the current sampling period.

13. The controller-implemented methodology of claim 11, wherein the ending location of the carrier waveform from the prior sampling period is substantially the same as a starting location of the carrier waveform during the current sampling period.

14. The controller-implemented methodology of claim 13, wherein the determination whether or not to insert the intermediate carrier shape comprise a determination to not insert the intermediate carrier shape into the carrier waveform during the current sampling period.

15. The controller-implemented methodology of claim 11, wherein the ending location of the carrier waveform from the prior sampling period is different from a starting location of the carrier waveform during the current sampling period.

16. The controller-implemented methodology of claim 15, wherein the determination whether or not to insert the intermediate carrier shape comprise a determination to insert the intermediate carrier shape into the carrier waveform during the current sampling period.

17. The controller-implemented methodology of claim 16, wherein the ending location of the carrier waveform from the prior sampling period is substantially the same as a starting location of the intermediate carrier shape.

18. The controller-implemented methodology of claim 17, wherein an ending location of the intermediate carrier shape is substantially the same as the starting location of the carrier waveform during the current sampling period.

19. The controller-implemented method of claim 11, wherein the clamping state selection methodology further comprises dynamically selecting the clamping state and the to-be-clamped phase leg based on a sector-by-sector analysis of a space vector hexagon.

20. The controller-implemented methodology of claim 19, wherein the clamping state selection methodology utilizes a control logic that adapts the clamping strategy in real time according to at least one of instantaneous power processed by a load or predicted losses across transistors of each of the multiple phase leg.

* * * * *